(12) United States Patent
Jaworski et al.

(10) Patent No.: US 10,000,242 B2
(45) Date of Patent: Jun. 19, 2018

(54) BOTTOM RAIL ASSEMBLY FOR TRAILERS

(71) Applicant: Hyundai Translead, San Diego, CA (US)

(72) Inventors: Leszek S. Jaworski, San Diego, CA (US); Enrique Chavez, Jr., El Cajon, CA (US)

(73) Assignee: HYUNDAI TRANSLEAD, San Diego, CA (US)

( * ) Notice: Subject to any disclaimer, the term of this patent is extended or adjusted under 35 U.S.C. 154(b) by 0 days. days.

(21) Appl. No.: 15/344,347

(22) Filed: Nov. 4, 2016

(65) Prior Publication Data

US 2018/0105212 A1    Apr. 19, 2018

Related U.S. Application Data

(60) Provisional application No. 62/407,752, filed on Oct. 13, 2016.

(51) Int. Cl.
*B62D 25/20* (2006.01)
*B62D 33/04* (2006.01)
*B60R 13/07* (2006.01)

(52) U.S. Cl.
CPC .......... *B62D 25/2054* (2013.01); *B60R 13/07* (2013.01); *B62D 33/04* (2013.01)

(58) Field of Classification Search
CPC .... B62D 21/20; B62D 25/02; B62D 25/2054; B62D 33/023; B62D 33/04; B62D 63/084; B60R 13/07
USPC ........................................... 296/184.1, 186.1
See application file for complete search history.

(56) References Cited

U.S. PATENT DOCUMENTS

| | | | | |
|---|---|---|---|---|
| 2,945,721 A * | 7/1960 | Chaney | ................ | B62D 33/023 296/183.1 |
| 3,692,349 A * | 9/1972 | Ehrlich | ................... | B62D 33/04 296/186.1 |
| 4,031,677 A * | 6/1977 | Tantlinger | .......... | B62D 25/2054 403/266 |
| 4,613,182 A * | 9/1986 | Stone | .................... | B62D 33/04 105/378 |
| 5,584,527 A * | 12/1996 | Sitter | ................... | B62D 33/046 105/409 |
| 5,588,693 A * | 12/1996 | Higginson | ........... | B62D 33/046 296/186.1 |
| 6,270,150 B1 * | 8/2001 | Miller | .................... | B62D 21/17 296/184.1 |
| 7,722,112 B2 * | 5/2010 | Ehrlich | ................ | B62D 29/045 296/186.1 |
| 2006/0170249 A1 * | 8/2006 | Conny | ................. | B23K 33/008 296/186.1 |
| 2010/0019536 A1 * | 1/2010 | Bloodworth | ......... | B61D 17/005 296/184.1 |

\* cited by examiner

*Primary Examiner* — Gregory A Blankenship
(74) *Attorney, Agent, or Firm* — Procopio, Cory, Hargreaves & Savitch LLP

(57) ABSTRACT

A bracket molding formed on a bottom rail assembly of a trailer coupled to a sandwich panel sidewall, the bracket molding including: a sloped top surface configured to create a space below a bottom surface of the sandwich panel sidewall to allow contaminants to drain from beneath the sandwich panel sidewall; and a dam formed on the sloped top surface, the dam configured to seal out the contaminants from accumulating in the space below the bottom surface of the sandwich panel sidewall.

11 Claims, 8 Drawing Sheets

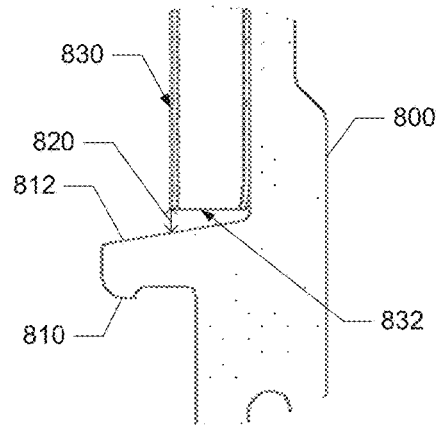
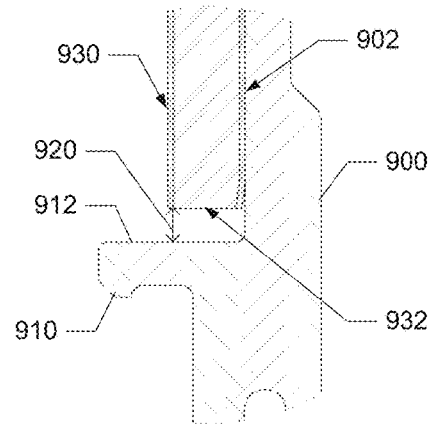
FIG. 8              FIG. 9
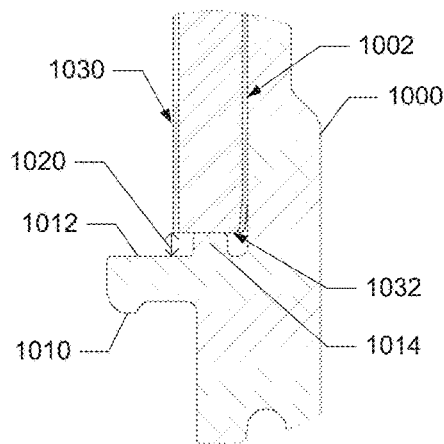
FIG. 10

BOTTOM RAIL ASSEMBLY FOR TRAILERS

CROSS-REFERENCE TO RELATED APPLICATIONS

This application claims the benefit of priority under 35 U.S.C. § 119(e) of U.S. Provisional Patent Application No. 62/407,752, filed Oct. 13, 2016, entitled "Improvements to Bottom Rail Assembly of Trailers." The disclosure of the above-referenced application is incorporated herein by reference.

BACKGROUND

Field of the Invention

The present disclosure relates to a bottom rail assembly of a trailer, and more specifically, to an improved bottom rail assembly configured to substantially reduce the moisture seeping in to form corrosion on metallic elements of a sidewall.

Background

A truck trailer, commonly referred to as a semitrailer, is a vehicle that often operates as a part of a domestic or international transport infrastructure. An important area of a truck trailer is the bottom rail assembly that couples to a sandwich panel sidewall. The bottom rail assembly is used to couple the sandwich panel sidewall to the floor structure and includes tensile structural elements used in frameless (monocoque) construction. The sandwich panel sidewall is a composite panel configured to utilize high strength metal sheets bonded to a high density plastic core with protective coatings on both sides for extra corrosion resistance.

However, the conventional design of the bottom rail assembly allows contaminants including water, moisture, and brine to seep into the sandwich panel sidewall through the bottom to cause corrosion. The corrosion cause by the contaminants seeping in through the bottom can destroy, weaken, or damage the metal and other material of the sidewall and the rail assembly by chemical reaction and other means.

Trailers operating in harsh winter-like environments are at an increased risk for corrosion. De-icing agents used on roads, and the chemical washes used to clean them can accelerate the formation of corrosion. Furthermore, the sidewalls may be cut by shearing, which leaves the bottom edges of the sandwich panel sidewalls exposed and unprotected. The road spray and/or chemicals used for washing collect along the sidewalls of the trailers. Gravity then pulls the solution down to the edges of the panel where it can collect and cause accelerated corrosion.

SUMMARY

The present disclosure describes a bottom rail assembly of a trailer.

In one embodiment, a bracket molding formed on the bottom rail assembly of the trailer coupled to a sandwich panel sidewall is disclosed. The bracket molding includes: a sloped top surface configured to create a space below the bottom surface of the sandwich panel sidewall to allow contaminants to drain from beneath the sandwich panel sidewall; and a dam formed on the sloped top surface, the dam configured to seal out the contaminants from accumulating in the space below the bottom surface of the sandwich panel sidewall.

In another embodiment, a bottom rail assembly of a trailer coupled to a sandwich panel sidewall is disclosed. The bottom rail assembly includes: a body coupled to the sandwich panel sidewall; and a bracket molding coupled to the body, the bracket molding including a sloped top surface, the sloped top surface configured to create a space below the sandwich panel sidewall.

In yet another embodiment, a bottom rail assembly of a trailer coupled to a sandwich panel sidewall is disclosed. The bottom rail assembly includes: a body including a side surface attached to the sandwich panel sidewall; and a bracket molding coupled to the body, the bracket molding including a top surface, wherein the sandwich panel sidewall is attached to the side surface of the body and above the top surface of the bracket molding by a height that is sufficient to allow contaminants to drain and substantially reduce capillary effects on the sandwich panel sidewall.

Other features and advantages of the present disclosure should be apparent from the present description which illustrates, by way of example, aspects of the present disclosure.

BRIEF DESCRIPTION OF THE DRAWINGS

The details of the present disclosure, both as to its structure and operation, may be gleaned in part by study of the appended drawings, in which like reference numerals refer to like parts, and in which:

FIG. 8 is a side view of a bottom rail assembly in accordance with another embodiment of the present disclosure;

FIG. 9 is a side view of a bottom rail assembly in accordance with another embodiment of the present disclosure; and FIG. 10 is a side view of a bottom rail assembly in accordance with another embodiment of the present disclosure.

DETAILED DESCRIPTION

As stated above, the conventional design of the bottom rail assembly allows contaminants including water, moisture, and brine to seep into the sandwich panel sidewall through the bottom to cause corrosion. The corrosion cause by the contaminants seeping in through the bottom can destroy, weaken, or damage the metal and other material of the sidewall and the rail assembly by chemical reaction and other means.

Several embodiments of the improved bottom rail assembly are proposed herein to eliminate or substantially reduce the moisture seeping in through the bottom of the sandwich panel sidewall and forming corrosion on metallic elements. After reading this description it will become apparent how to implement the present disclosure in various embodiments and applications. However, although various embodiments of the present disclosure will be described herein, it is understood that these embodiments are presented by way of example only, and not limitation. As such, this detailed description of various embodiments should not be construed to limit the scope or breadth of the present disclosure.

Figure 1A:
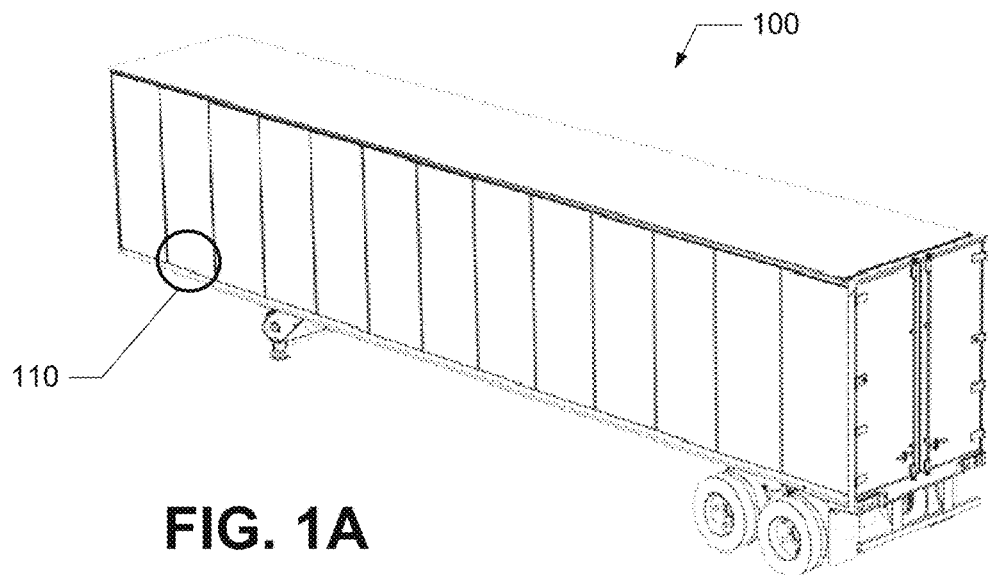
FIG. 1A is a perspective view of a truck trailer showing an area of interest including the sandwich panel sidewall coupled to the bottom rail assembly in accordance with one embodiment of the present disclosure.

FIG. 1A is a perspective view of a truck trailer 100 showing an area of interest 110 including the sandwich panel sidewall coupled to the bottom rail assembly in accordance with one embodiment of the present disclosure.

Figure 1B:
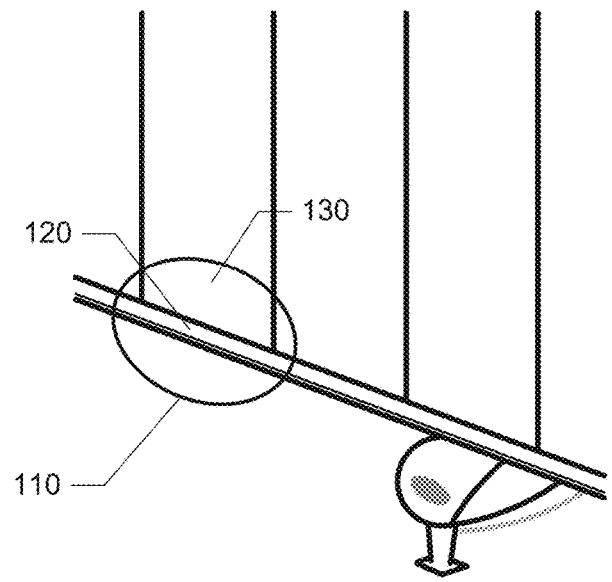
FIG. 1B is a close-up view of the area of interest including the bottom rail assembly and the sandwich panel sidewall.

FIG. 1B is a close-up view of the area of interest 110 including the bottom rail assembly 120 and the sandwich panel sidewall 130.

Figure 2:
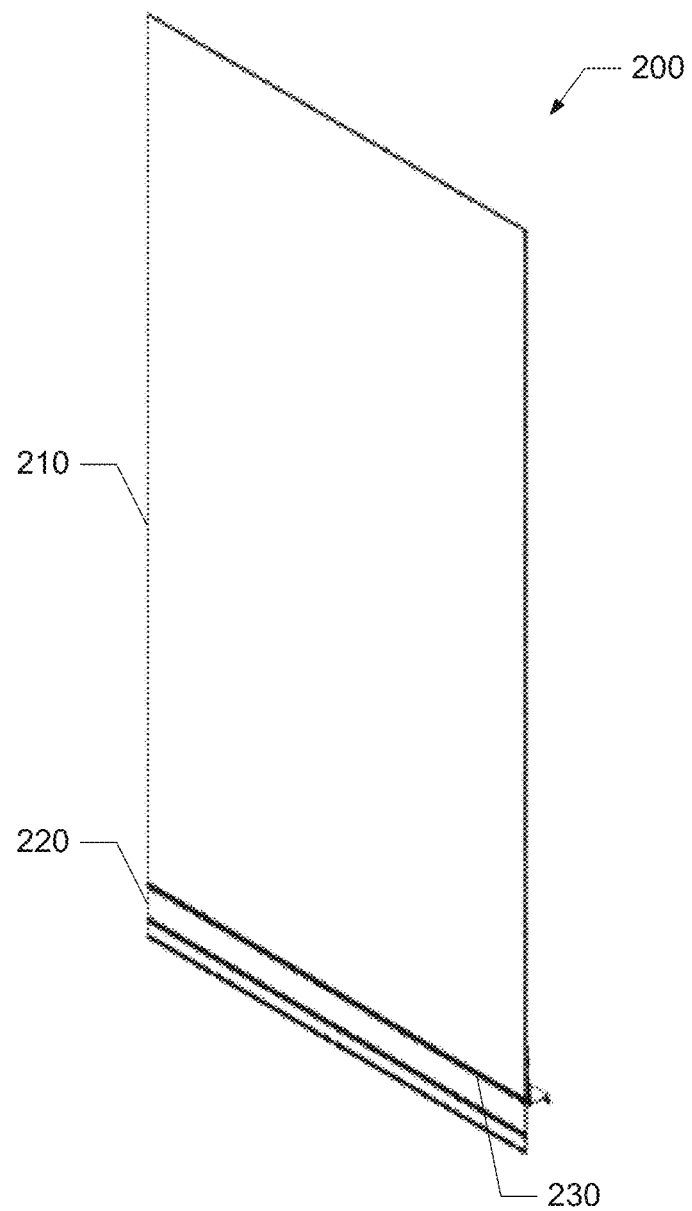
FIG. 2 is a perspective view of an area of interest covering substantially similar area as the area of interest shown in FIG. 1B.

FIG. 2 is a perspective view of an area of interest 200 covering substantially similar area as the area of interest 110 shown in FIG. 1B. In FIG. 2, the area of interest 200 includes a sandwich panel sidewall 210 coupled to a bottom rail assembly 220 at the bottom surface of the sandwich panel sidewall 210 and the top surface 230 of a bracket molding on the bottom rail assembly 220.

Figure 3:
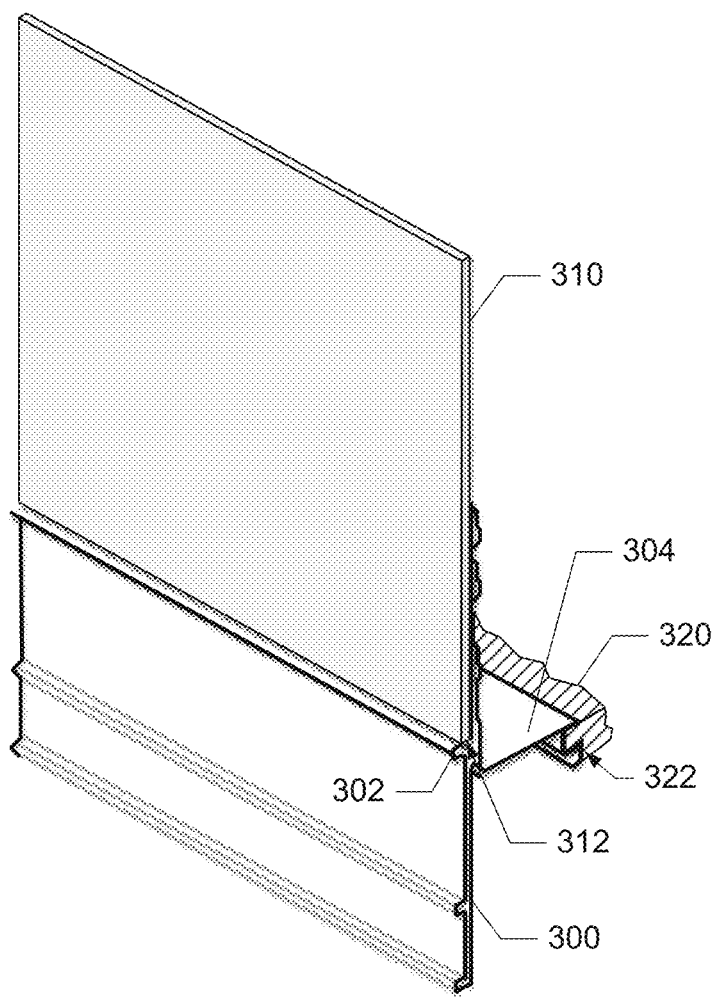
FIG. 3 is a close-up perspective view of a bottom rail assembly coupled to a sandwich panel sidewall.

FIG. 3 is a close-up perspective view of a bottom rail assembly 300 coupled to a sandwich panel sidewall 310. The bottom rail assembly 300 also includes an extrusion 304 which extends into the trailer. In the illustrated embodiment of FIG. 3, the extrusion 304 is secured to the lateral end 322 of the floor 320 of the trailer and extends the entire axial length of the floor 320 to add strength and rigidity to the floor 320. In one embodiment, the bottom rail assembly 300 is formed as an aluminum extrusion using suitable aluminum alloy. In FIG. 3, the bottom surface 312 of the sandwich panel sidewall 310 rests on a bracket molding 302 of the bottom rail assembly 300.

Figure 4A:
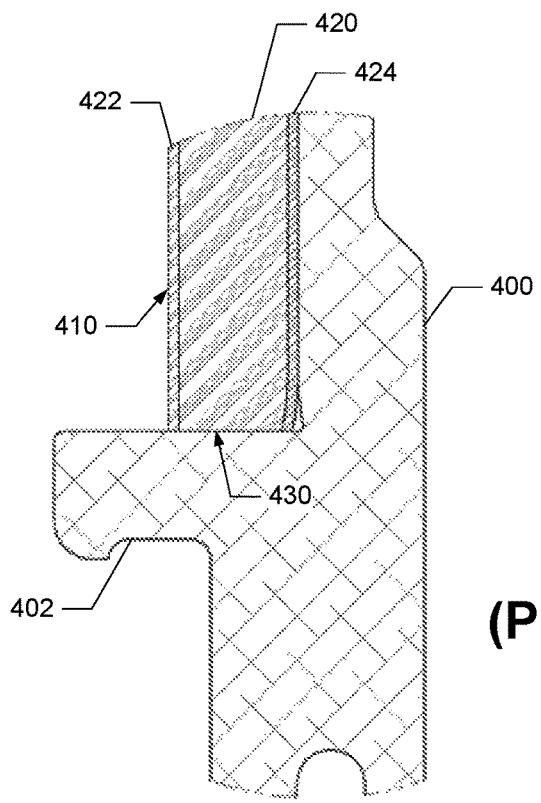
FIGS. 4A and 4B are detailed side views of a conventional bottom rail assembly configured to receive the sandwich panel sidewall.
Figure 4B:
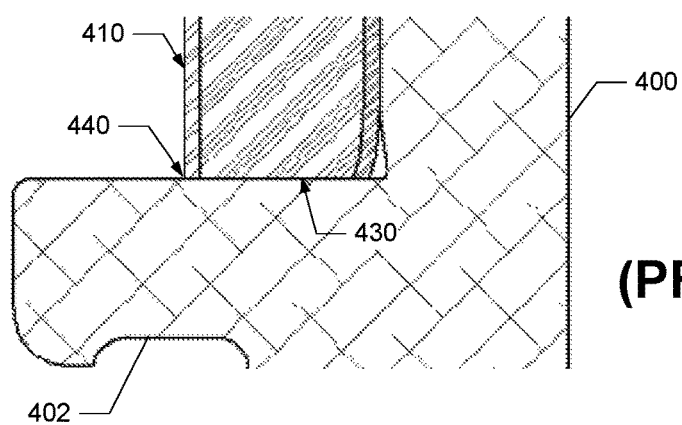

FIGS. 4A and 4B are detailed side views of a conventional bottom rail assembly 400 configured to receive the sandwich panel sidewall 410. In one configuration, the sandwich panel sidewall 410 is composed of a core 420 (e.g., plastic) sandwiched between a pair of hard outer facings 422, 424 (e.g., metallic material like steel). Further, the bottom surface of the sandwich panel sidewall 410 is configured to rest on a bracket molding 402 of the bottom rail assembly 400.

In the configuration of the conventional bottom rail assembly 400 of FIGS. 4A and 4B, the flat surface 430 of the bracket molding 402 of the bottom rail assembly 400 provides minimal resistance for contaminants including water, moisture, and brine to contact the bottom surface of the sandwich panel sidewall 410. Often, the capillary effect amplifies the draw of the contaminants into a gap 440 between the flat surface 430 of the bracket molding 402 and the bottom surface of the sandwich panel sidewall 410 and causes corrosion. As described above, the corrosion caused by the contaminants seeping in through the bottom can destroy, weaken, or damage the metal and other material of the sidewall and the bottom rail assembly by chemical reaction and other means.

Figure 5A:
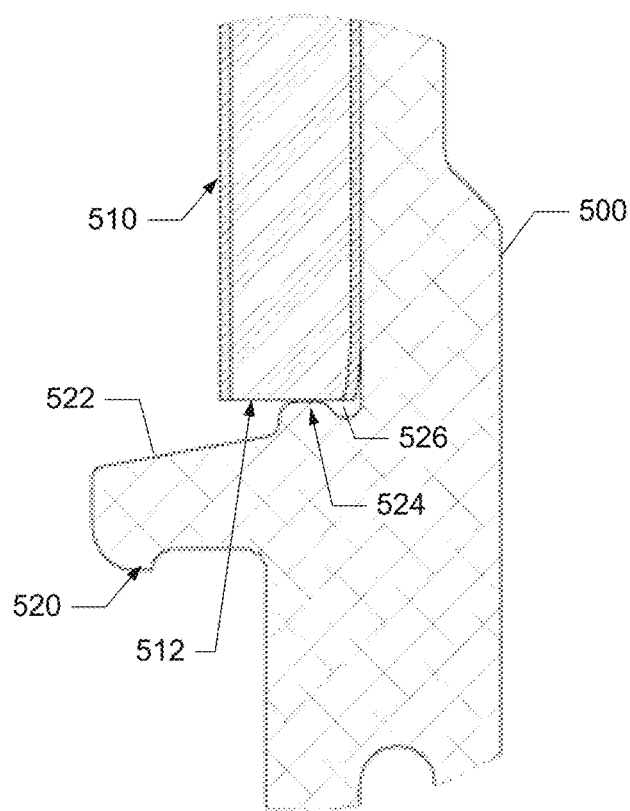
FIG. 5A is a side view of a bottom rail assembly in accordance with one embodiment of the present disclosure.
Figure 5B:
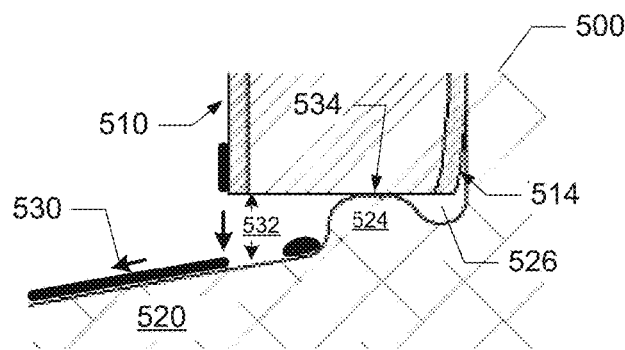
FIG. 5B is a close-up view of the bottom rail assembly including a bracket molding and a dam formed on the top surface of the bracket molding.

FIG. 5A is a side view of a bottom rail assembly 500 in accordance with one embodiment of the present disclosure. FIG. 5B is a close-up view of the bottom rail assembly 500 including a bracket molding 520 and a dam 524 formed on the top surface 522 of the bracket molding 520. Further, the sandwich panel sidewall 510 rests on the dam 524 of the bracket molding 520.

In the illustrated embodiment of FIGS. 5A and 5B, the bottom rail assembly 500 is configured with the bracket molding 520 having the top surface 522 that is sloped downward. In this embodiment, the top surface 522 is sloped to create a space (see 532 in FIG. 5B) between the bottom surface 512 of the sandwich panel sidewall 510 and the top surface 522 of the bracket molding 520 on the bottom rail assembly 500. The sloped top surface 522 also allows the contaminants to drain (see 530 in FIG. 5B). Thus, the height of the space 532 should be sufficient to substantially reduce the capillary effects described above regarding the conventional bottom rail assembly. The sloped top surface 522 also includes a dam 524 which seals out (see 534 in FIG. 5B) the contaminants from accumulating in an area 526 under the inner-facing part 514 of the sandwich panel sidewall 510.

Figure 6:
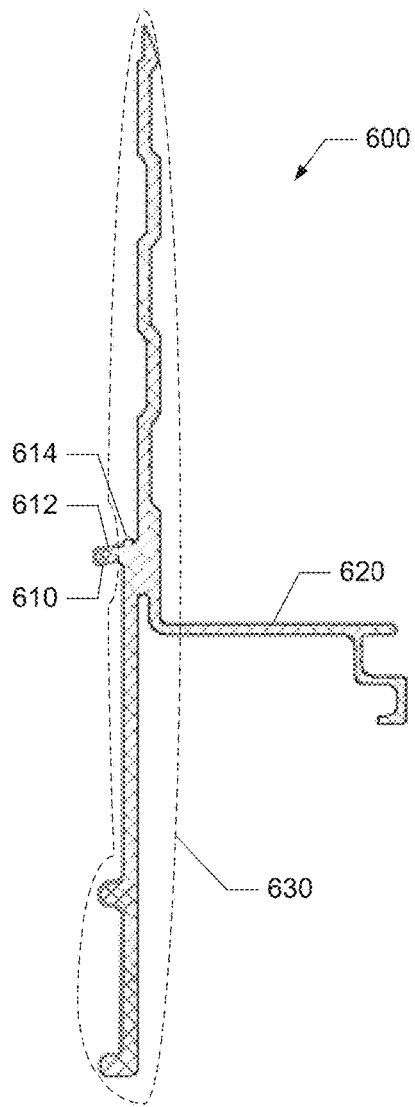
FIG. 6 is a side view of a bottom rail assembly in accordance with one embodiment of the present disclosure.

FIG. 6 is a side view of a bottom rail assembly 600 in accordance with one embodiment of the present disclosure. In the illustrated embodiment of FIG. 6, the bottom rail assembly 600 includes a body 630, a bracket molding 610 and an extrusion 620. In one embodiment, the bracket molding 610 includes a dam 614 formed on the sloped top surface 612.

Figure 7A:
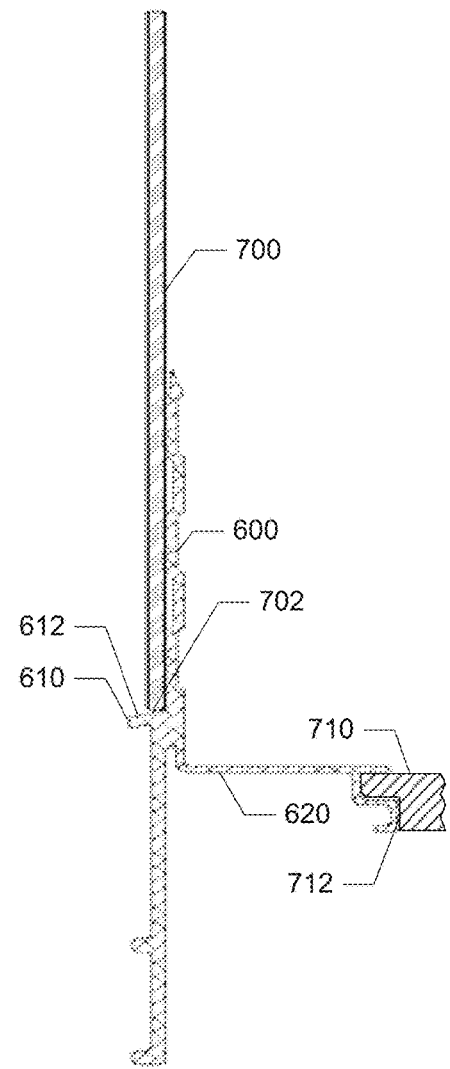
FIG. 7A is a side view of the bottom rail assembly coupled to the sandwich panel sidewall and the floor.

FIG. 7A is a side view of the bottom rail assembly 600 coupled to the sandwich panel sidewall 700 and the floor 710. As described above, the top surface 612 of the bracket molding 610 of the bottom rail assembly 600 couples to the bottom surface 702 of the sandwich panel sidewall 700, while the extrusion 620 of the bottom rail assembly 600 couples to the lateral end 712 of the floor 710.

Figure 7B:
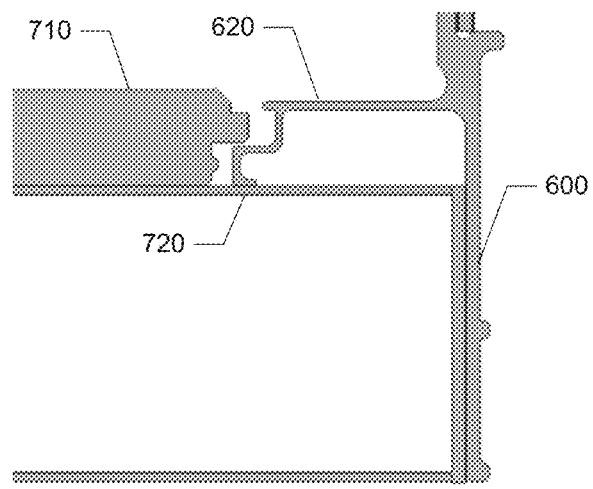
FIG. 7B is another side view of the bottom rail assembly coupled to the floor and a cross member.
Figure 7C:
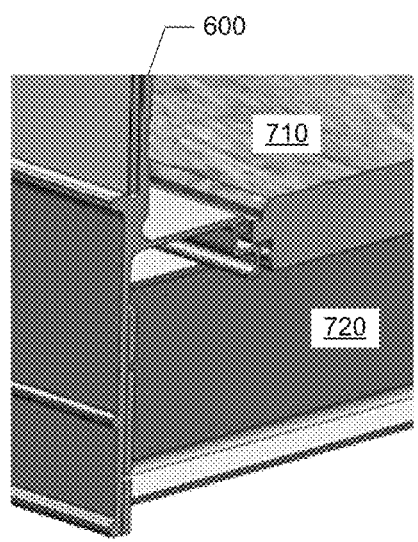
FIGS. 7C and 7D are two perspective views of the bottom rail assembly coupled to the floor and the cross member.
Figure 7D:
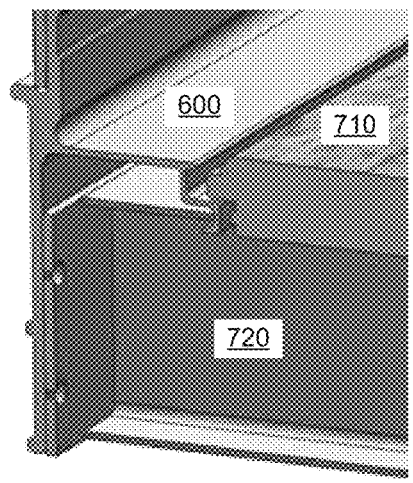

FIG. 7B is another side view of the bottom rail assembly 600 coupled to the floor 710 and a cross member 720 (which supports the floor). FIGS. 7C and 7D are two perspective views of the bottom rail assembly 600 coupled to the floor 710 and the cross member 720.

FIG. 8 is a side view of a bottom rail assembly 800 in accordance with another embodiment of the present disclosure. In this embodiment, the bottom rail assembly 800 includes a bracket molding 810 with the sloped top surface 812, but with no dam. However, the sloped top surface 812 of the bracket molding 810 creates a space 820 between the bottom surface 832 of the sandwich panel sidewall 830 and the top surface 812 of the bracket molding 810 on the bottom rail assembly 800 to allow the contaminants to drain and substantially reduce the capillary effects described above regarding the conventional bottom rail assembly.

FIG. 9 is a side view of a bottom rail assembly 900 in accordance with another embodiment of the present disclosure. In this embodiment, the bottom rail assembly 900 includes a bracket molding 910 with the flat top surface 912 and with no dam. However, a space 920 between the bottom surface 932 of the sandwich panel sidewall 930 and the flat top surface 912 of the bracket molding 910 is created when the sandwich panel sidewall 930 is attached to the side surface 902 of the bottom rail assembly 900 slightly above the flat top surface 912 at a distance equal to the height of the space 920. The height of the space 920 is configured to be sufficient for the contaminants to drain and substantially reduce the capillary effects described above regarding the conventional bottom rail assembly.

FIG. 10 is a side view of a bottom rail assembly 1000 in accordance with another embodiment of the present disclosure. In this embodiment, the bottom rail assembly 1000 includes a bracket molding 1010 with the flat top surface 1012 and a dam 1014. Further, a space 1020 between the bottom surface 1032 of the sandwich panel sidewall 1030 and the flat top surface 1012 of the bracket molding 1010 is created when the sandwich panel sidewall 1030 is attached to the side surface 1002 of the bottom rail assembly 1000 slightly above the flat top surface 1012 at a distance equal to the height of the space 1020 and flush with the dam 1014. The creation of the space 1020 allows the contaminants to drain and substantially reduce the capillary effects described above regarding the conventional bottom rail assembly.

The descriptions of the disclosed embodiments are provided to enable any person skilled in the art to make or use the disclosure. Various modifications to these embodiments will be readily apparent to those skilled in the art, and the generic principles described herein can be applied to other embodiments without departing from the spirit or scope of the disclosure. Thus, it is to be understood that the description presented herein represent embodiments representative of the subject matter which is broadly contemplated by the present disclosure.

Additional variations and embodiments are also possible. Accordingly, the technology is not limited only to the specific examples noted herein.

The invention claimed is:

1. A bracket molding formed on a bottom rail assembly of a trailer coupled to a sandwich panel sidewall, the bracket molding comprising:
   a sloped top surface configured to create a space below a bottom surface of the sandwich panel sidewall to allow contaminants to drain from beneath the sandwich panel sidewall; and
   a dam formed on the sloped top surface, the dam configured to seal out the contaminants from accumulating in the space below the bottom surface of the sandwich panel sidewall.

2. The bracket molding of claim 1, wherein the dam is configured such that the bottom surface of the sandwich panel sidewall seats on the dam to seal out the contaminants.

3. The bracket molding of claim 1, wherein the space below the bottom surface of the sandwich panel sidewall is configured to be large enough to prevent a capillary effect on the sandwich panel sidewall which can draw the contaminants to cause corrosion of the sandwich panel sidewall.

4. A bottom rail assembly of a trailer coupled to a sandwich panel sidewall, comprising:
   a body coupled to the sandwich panel sidewall; and
   a bracket molding coupled to the body, the bracket molding including a sloped top surface, the sloped top surface configured to create a space below the sandwich panel sidewall,
   wherein the bracket molding further comprises
   a dam formed on the sloped top surface, the dam configured to seal out contaminants from accumulating in the space below a bottom surface of the sandwich panel sidewall.

5. The bottom rail assembly of claim 4, wherein the space below the bottom surface of the sandwich panel sidewall is configured to be large enough to prevent a capillary effect on the sandwich panel sidewall which can draw contaminants to cause corrosion of the sandwich panel sidewall.

6. The bottom rail assembly of claim 4, further comprising
   an extrusion coupled to the body and to a floor of the trailer.

7. A bottom rail assembly of a trailer coupled to a sandwich panel sidewall, comprising:
   a body including a side surface attached to the sandwich panel sidewall; and
   a bracket molding coupled to the body, the bracket molding including a top surface,
   wherein the sandwich panel sidewall is attached to the side surface of the body and above the top surface of the bracket molding by a height that is sufficient to allow contaminants to drain and substantially reduce capillary effects on the sandwich panel sidewall,
   wherein the bracket molding further comprises
   a dam formed on the top surface, the dam configured to seal out the contaminants from accumulating in a space below a bottom surface of the sandwich panel sidewall.

8. The bottom rail assembly of claim 7, wherein the top surface of the bracket molding is configured to be flat.

9. The bottom rail assembly of claim 7, wherein the top surface of the bracket molding is configured to be sloped.

10. The bottom rail assembly of claim 7, wherein a space below a bottom surface of the sandwich panel sidewall is configured to be large enough to prevent a capillary effect on the sandwich panel sidewall.

11. The bottom rail assembly of claim 7, further comprising
    an extrusion coupled to the body and to a floor of the trailer.

* * * * *